(No Model.) 2 Sheets—Sheet 2.

W. S. BELLOWS.
GLASS BLOWING MACHINE.

No. 548,600. Patented Oct. 22, 1895.

Witnesses: Inventor:

UNITED STATES PATENT OFFICE.

WILLIAM S BELLOWS, OF SPRINGFIELD, MASSACHUSETTS, ASSIGNOR TO EDWARD D. LIBBEY, OF TOLEDO, OHIO.

GLASS-BLOWING MACHINE.

SPECIFICATION forming part of Letters Patent No. 548,600, dated October 22, 1895.

Application filed April 5, 1895. Serial No. 544,635. (No model.)

*To all whom it may concern:*

Be it known that I, WILLIAM S. BELLOWS, a citizen of the United States, residing at Springfield, in the county of Hampden and State of Massachusetts, have invented new and useful Improvements in Glass-Blowing Machines, of which the following is a specification.

This invention relates to improvements in glass-blowing machines of the class in which are comprised traveling mold-carriers with "paste" molds thereon, and means for supporting removable blowpipes in co-operative proximity to the traveling molds, and for supplying a pressure of air through the blowpipes, all whereby, while the attendant is removing one of the blowpipes from the machine, and the blown and molded glass object from one of the molds, and is placing another blowpipe with a gathering of plastic glass into the machine, the blowing and molding operations in the other of the plurality of traveling molds will be automatically performed.

The object of the present invention is to provide and combine in a multiple-mold machine in which the molds, respectively mounted on the mold-carriers thereof, are sectional and have combined therewith means for periodically opening and closing them during the continuance of the operation of the machine, improved, simplified, and efficient means for automatically and thoroughly wetting the paste-line surfaces of the sectional molds when the latter open to discharge an already blown and molded article, and are in readiness to receive therewithin and to close about another gathering of glass upon the end of a newly-introduced blowpipe.

To these ends the invention consists in the combination or arrangement of mechanisms or apparatus and in the constructions of such mechanisms, all substantially as will hereinafter fully appear, and be set forth in the claims.

Reference is to be had to the accompanying drawings, in which—

Figure 1:
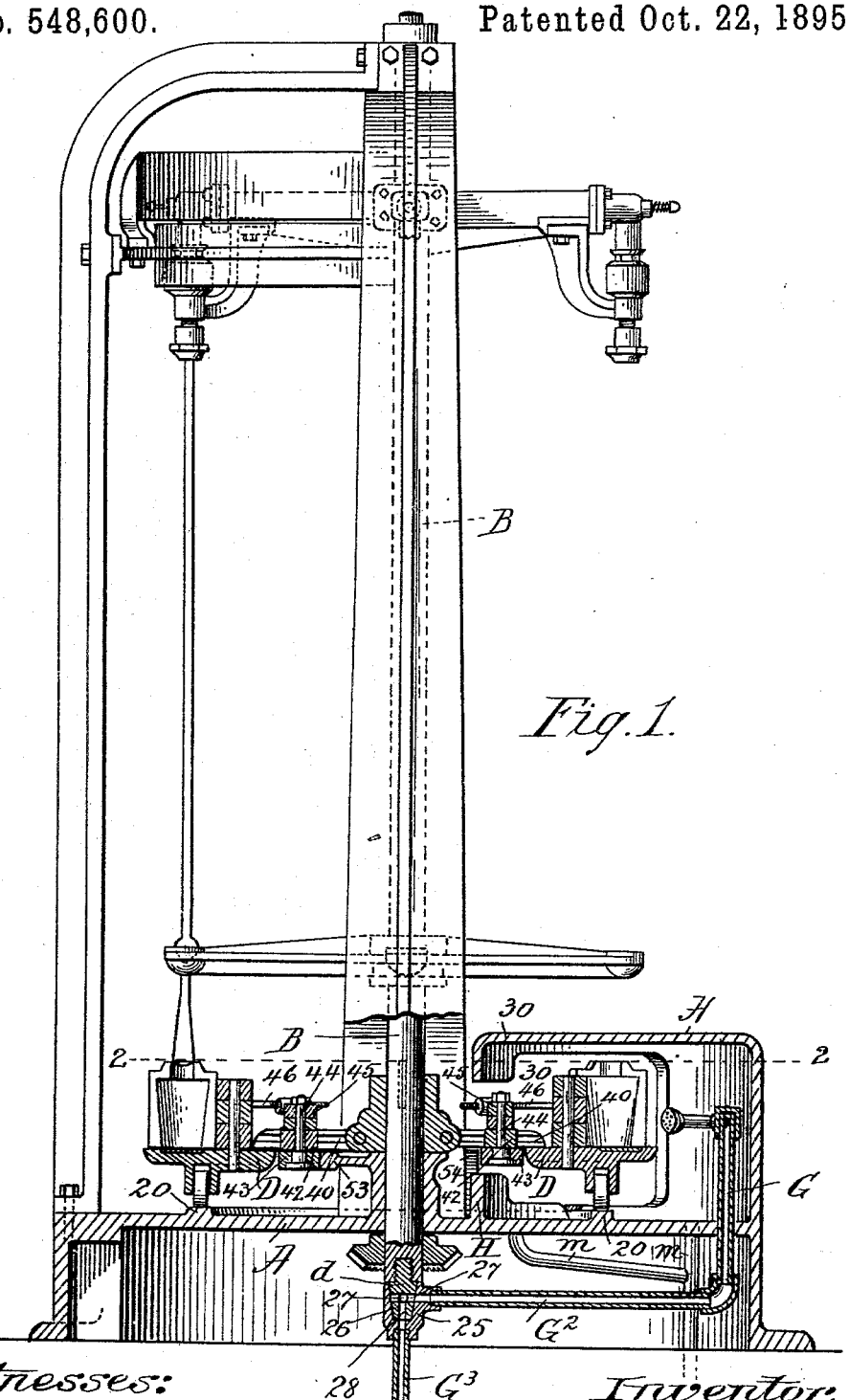
Figure 2:
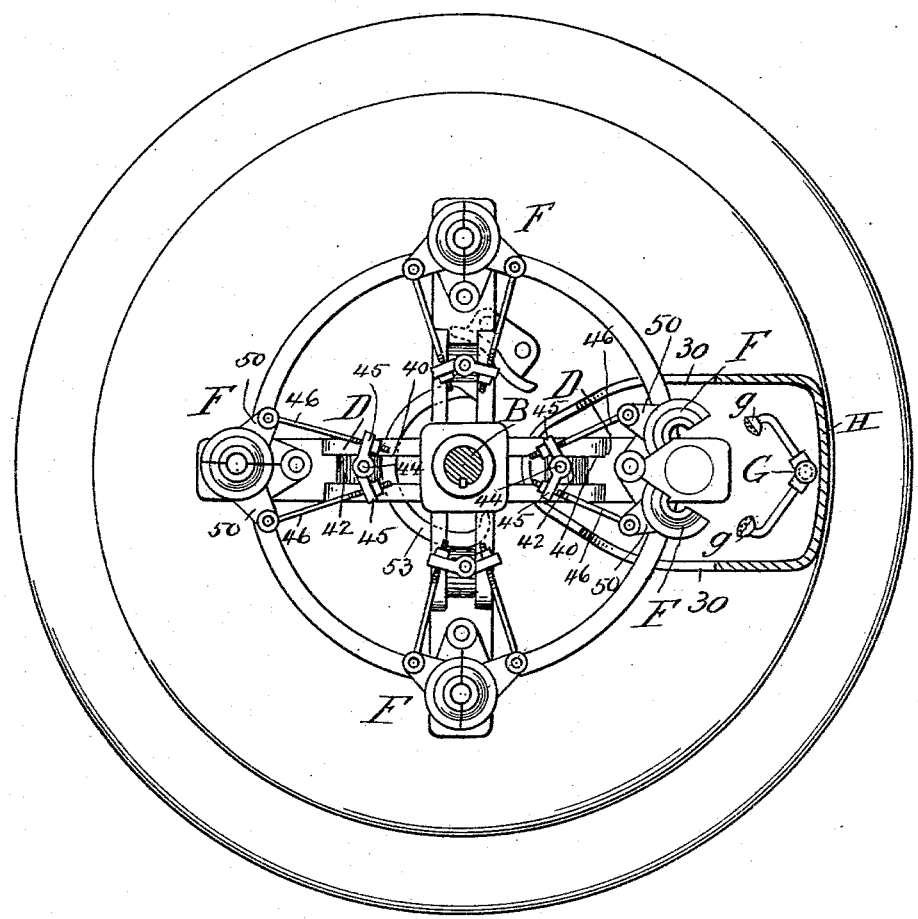
Figure 3:
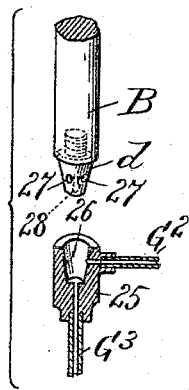

Figure 1 is an elevation of a multiple-mold glass-blowing machine with the lower portion thereof in central vertical section. Fig. 2 is a plan and horizontal sectional view as taken below the sectional line 2 2, Fig. 1. Fig. 3 is a view illustrating the valve which is comprised in the present improved machine.

The machine embodying the present improvements will be described in detail.

In the drawings, A represents the base, rising above which is the shaft B, suitable journals thereof being provided. D D represent mold-carriers, which are connected to and extend radially from said shaft and derive their revoluble movements in a constant plane by reason of the rotation of the shaft. F F represent sectional molds, the same being pivotally mounted on the mold-carriers to open and close, and they have combined with them opening and closing mechanism which in itself forms no part of the present invention, but which will be briefly described thus: Each mold-carrier is intermediately of its length formed with the slideway 40 for the slide-block 42, which has at its lower side the roller 43, which is mounted to rotate on the vertical stud 44, that is affixed upon and extends above and below the slide-block 42. The angularly-arranged arms 45 are secured firmly and immovably at the upper end of the stud 44 and have engaged therewith the connecting-rods 46, which also have engagements with the radial arms 50 of the mold-sections. The upstanding hub 52 at the central portion of the base has the semicircular flange 53, around on the edge of which the rollers of the slides run as the mold-carriers are revolved. Opposite and located outwardly beyond one end of the semicircular flange 53 is an upstanding cam-rib 54, against which the roller of each slide impinges as the mold-carrier approaches the place in the machine where the mold-sections are to be opened so as to force the slide inwardly and to cause, through the said connection between the slide and the mold-sections, the automatic opening of the molds at the proper intervals. As the revoluble travel of each mold-carrier is continued the roller 43 of the slide is impinged upon by the radially-prominent end or part of the partly-circular flange 53, whereby the slide is caused again to move outwardly and the mold sections to be closed.

The base A of the machine has a circular track 20, around on which the roller-provided mold-carriers run. In Fig. 2 the opened mold is seen at the right, adjacent to the location of which is a rising pipe G, the same being by the pipe-section $G^2$ connected with the liquid-supply pipe $G^3$, which is understood as being connected with a suitable reservoir or water-pressure.

The pipes G² and G³ are united by the coupling 25, within which there is a valve-seat 26, in which is seated a valve $d$, which is connected to and to rotate as one with the aforesaid shaft B, which it is understood impels the mold-carriers. The aforesaid valve $d$ is a four-way valve, having in addition to its radial ways or ports 27, which successively register with the port in the coupling leading to the pipe-section G², also the axial passage 28, which is constantly open to the pipe G³. The passage 28 and ports 27 27 are always in direct communication, the latter from the former.

By properly arranging the aforesaid radial ports in the valve $d$ relative to the traveling movements of the mold-carriers there will be a valve-port 27 open for the passage of water through the pipes G² and G³ and the sprinklers $g\ g$, all so that when the mold is brought to its opening position it will be sprinkled thoroughly, and only so long as it remains open, the sprinkling action ceasing upon the closing and withdrawal of the mold from proximity to the sprinkler.

Upon the base of the machine is provided an inclosure H, having at its inner end, and also at its two sides, which are substantially at right angles thereto, the openings 30 30, whereby the mold-carriers may pass through, within, and out from this inclosure without obstruction thereby. This provides a guard against an undue spattering and sprinkling by the sprinkler of parts of the machine which it is desired to avoid wetting, so far as this may be conveniently done. The inclosure also excludes dust from the mold.

M M represent drip-pipes leading from that portion of the base of the machine which is within the inclosure H for carrying away the waste water after the same has been utilized for wetting the paste-lined molds.

Having thus described my invention, what I claim, and desire to secure by Letters Patent, is—

1. In a glass blowing machine the combination with a series of mold-carriers, each with a sectional mold thereon, means for imparting the traveling movements to the mold-carriers, and means for automatically and periodically opening the mold sections, of a conduit connected with a liquid supply, arranged to direct the liquid which passes therethrough upon the interior of the opened sectional mold, substantially as described.

2. In a glass blowing machine, the combination with a series of mold-carriers, all revoluble in a constant plane, each with a sectional mold thereon, means for imparting the traveling movements to the mold carriers, and means for automatically and periodically opening the mold sections, of a conduit connected with liquid supply, arranged to direct the liquid which passes therethrough upon the interior of the opened sectional mold, substantially as described.

3. In a glass blowing machine, the combination with the series of mold-carriers, all movable in a constant plane, each with a sectional mold thereon, means for imparting traveling movement to the carriers and means for automatically and periodically opening the mold sections, of a conduit connected with a liquid supply, supported independently of the mold-carriers and past which they successively move, and provided with a sprinkler directed toward the location at which the sectional molds open, substantially as described.

4. In a glass blowing machine the combination with the series of mold carriers, each with the sectional mold thereon, together with means for imparting traveling movements to the carriers for automatically and periodically opening the mold sections, of a conduit connected with a liquid supply, supported independently of the mold carriers and past which they successively move, provided with a sprinkler directed toward the location at which the sectional molds open, and a valve in said conduit, and means for automatically and periodically opening and closing said valve, substantially concurrently with the opening and closing of the sectional molds.

5. In a glass blowing machine the combination with the shaft B, having connected thereto the multiple port valve, and having also connected thereto a series of mold carriers, which are revoluble thereabout, the sectional molds mounted on the carriers having combined therewith means for automatically opening and closing the mold sections, the pipes G provided with a sprinkler, located adjacent to the opening position of the molds and having periodically, through the ports of the said valve, communication with the source of liquid supply, substantially as and for the purposes set forth.

6. In a glass blowing machine the combination with the series of mold-carriers, each with a separable sectional mold thereon, and means for automatically opening and closing the mold sections, of a conduit, to be connected with a liquid supply, located adjacent the position at which the mold opens, for flushing the open mold, and an inclosure surrounding the said conduit, substantially as described.

7. In a glass blowing machine the combination with the series of mold-carriers, each with a separable sectional mold thereon, and means for automatically opening and closing the mold sections, of a conduit, to be connected with a liquid supply, located adjacent the position at which the mold opens for flushing the opened mold, and an inclosure surrounding the said conduit and having a waste pipe or pipes leading from the bottom thereof, substantially as described.

WM. S. BELLOWS.

Witnesses:
H. A. CHAPIN,
K. I. CLEMONS.